(12) United States Patent
Masuda

(10) Patent No.: US 9,718,368 B2
(45) Date of Patent: Aug. 1, 2017

(54) CHARGING DEVICE FOR VEHICLE

(71) Applicant: Tomokazu Masuda, Kasugai (JP)

(72) Inventor: Tomokazu Masuda, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 45 days.

(21) Appl. No.: 14/766,868

(22) PCT Filed: Feb. 17, 2014

(86) PCT No.: PCT/IB2014/000159
§ 371 (c)(1),
(2) Date: Aug. 10, 2015

(87) PCT Pub. No.: WO2014/132113
PCT Pub. Date: Sep. 4, 2014

(65) Prior Publication Data
US 2016/0001667 A1    Jan. 7, 2016

(30) Foreign Application Priority Data

Feb. 26, 2013   (JP) .................................. 2013-035606

(51) Int. Cl.
*H02J 7/00* (2006.01)
*B60L 11/18* (2006.01)
*B60L 11/14* (2006.01)

(52) U.S. Cl.
CPC .......... *B60L 11/1818* (2013.01); *B60L 11/14* (2013.01); *B60L 11/185* (2013.01);
(Continued)

(58) Field of Classification Search
CPC .... B60L 11/1818; B60L 11/185; B60L 11/14; Y02T 10/70; Y02T 10/92
(Continued)

(56) References Cited

U.S. PATENT DOCUMENTS

2012/0091958 A1    4/2012  Ichikawa et al.
2012/0098488 A1*   4/2012  Ichikawa ............ B60L 11/1816
                                                    320/109
(Continued)

FOREIGN PATENT DOCUMENTS

CN       102474107 A     5/2012
CN       102803001 A    11/2012
(Continued)

*Primary Examiner* — Arun Williams
*Assistant Examiner* — Aaron Piggush
(74) *Attorney, Agent, or Firm* — Oliff PLC

(57) ABSTRACT

There is provided a charging device for a vehicle, which carries out timer charging in which the charging device, is set in a standby state without charging until charging start time comes when the charging start time is set. The charging device includes a charger that charges an electrical storage device of the vehicle with electric power supplied from a device outside the vehicle, a cable lock mechanism (260) that locks a charging cable in a state where the charging cable is connected to an inlet, and an electronic control unit (170) that determines whether to carry out timer charging or carry out instant charging without carrying out the timer charging on the basis of a state of a switch associated with operation of the cable lock mechanism (260).

11 Claims, 14 Drawing Sheets

(52) U.S. Cl.
CPC ....... *B60L 11/1816* (2013.01); *B60L 2230/12* (2013.01); *B60L 2230/16* (2013.01); *B60L 2250/10* (2013.01); *B60L 2250/16* (2013.01); *B60L 2260/58* (2013.01); *Y02T 10/70* (2013.01); *Y02T 10/7005* (2013.01); *Y02T 10/7077* (2013.01); *Y02T 10/7088* (2013.01); *Y02T 10/92* (2013.01); *Y02T 90/121* (2013.01); *Y02T 90/128* (2013.01); *Y02T 90/14* (2013.01); *Y02T 90/163* (2013.01); *Y10S 903/903* (2013.01)

(58) Field of Classification Search
USPC .......................................... 320/104, 109, 155
See application file for complete search history.

(56) References Cited

U.S. PATENT DOCUMENTS

2012/0098490 A1    4/2012  Masuda
2013/0088200 A1*  4/2013  Kamishima ............... B60L 3/04
                                                                  320/109

FOREIGN PATENT DOCUMENTS

| | | |
|---|---|---|
| EP | 2 447 106 A1 | 5/2012 |
| JP | 2010142026 A | 6/2010 |
| JP | 2012070623 A | 4/2012 |
| WO | 2010122647 A1 | 10/2010 |
| WO | 2011155207 A1 | 12/2011 |

* cited by examiner

⟨AUTOLOCK IS NOT SET AND TIMER IS SET⟩

⟨AUTOLOCK IS NOT SET AND TIMER IS NOT SET⟩

CHARGING DEVICE FOR VEHICLE

BACKGROUND OF THE INVENTION

1. Field of the Invention

The invention relates to a charging device for a vehicle on which an electrical storage device is mounted and, more particularly, to a charging device for a vehicle, which carries out timer charging.

2. Description of Related Art

In recent years, vehicles, such as electric vehicles and plug-in hybrid vehicles, configured to be able to charge a vehicle-mounted electrical storage device from an external device have started being widely used.

Japanese Patent Application Publication No. 2012-70623 (JP 2012-70623 A) describes a control device for a vehicle, which is able to adjust a charging schedule for charging an electrical storage device from an external power supply.

An ECU mounted on the vehicle described in this publication includes a charge control unit that causes a battery to be charged by controlling a charger and a start-up command unit that, when charging start time is set, issues a start-up command to the charge control unit such that the charge control unit is caused to wait until current time reaches the charging start time and to start charging the battery from the charging start time. When the start-up command unit has received a start command, the start-up command unit issues the start-up command to the charge control unit such that the battery starts being charged from the timing at which the start command has been received.

JP 2012-70623 A describes that the start-up command unit executes control such that the battery starts being charged from the timing at which the start command has been received when the start-up command unit has received the start command; however, it does not apparently describe the details of user's operation for issuing the start command to the start-up command unit.

It is presumable that a frequency at which a command for cancelling such timer reservation or a command for enabling timer reservation is given is extremely low depending on the way of user's usage. For example, a user who conducts normal charging without timer setting or a user who constantly conducts timer charging in accordance with timer setting extremely less frequently provides such a command.

Thus, the frequency at which an input switch for issuing a command is operated is also low, and the user is hard to realize an abnormality even when the switch has a failure. Therefore, in the case where the timer is set, when instant charging is intended by cancelling the timer setting, there is a concern that the timer setting cannot be cancelled and the instant charging cannot be carried out.

SUMMARY OF THE INVENTION

The invention provides a charging device for a vehicle, which increases the possibility that a failure on timer setting for charging is realized.

A first aspect of the invention provides a charging device for a vehicle, which carries out timer charging in which the charging device is set in a standby state without charging until charging start time comes when the charging start time is set. The charging device includes a charger, a lock mechanism and an electronic control unit. The charger is configured to charge an electrical storage device of the vehicle with electric power supplied from a device outside the vehicle. The lock mechanism is configured to lock a charging cable in a state where the charging cable is connected to an inlet. The electronic control unit is configured to determine whether to carry out the timer charging or carry out instant charging without carrying out the timer charging based on a state of a switch, the state of the switch being associated with operation of the lock mechanism, and the electronic control unit is configured to control the charger.

In the charging device, the electronic control unit may be configured to control the charger such that the charger carries out the instant charging when the switch is operated within a predetermined period of time from when the charging cable is connected to the inlet.

In the charging device, the electronic control unit may be configured to control the charger such that the charger carries out the timer charging when the switch is not operated within a predetermined period of time from when the charging cable is connected to the inlet.

In the charging device, the electronic control unit may be configured to control the charger such that the charger carries out the instant charging when the switch is not operated within a predetermined period of time from when the charging cable is connected to the inlet.

In the charging device, the electronic control unit may be configured to control the charger such that the charger carries out the timer charging when the switch is operated within a predetermined period of time from when the charging cable is connected to the inlet.

In the charging device, the electronic control unit may be configured to use the switch as a timer cancellation switch when the charging cable is not connected to the inlet, and the electronic control unit may be configured to use the switch as a switch for changing a locked state of the lock mechanism when the charging cable is connected to the inlet.

In the charging device, the electronic control unit may be configured to use the switch as a timer determination switch when the charging cable is not connected to the inlet, and the electronic control unit may be configured to use the switch as a switch for changing a locked state of the lock mechanism when the charging cable is connected to the inlet.

In the charging device, the electronic control unit may be configured to use the switch as a switch for causing the lock mechanism to lock the charging cable immediately after the charging cable is connected to the inlet, and the electronic control unit may be configured to control the charger such that the charger carries out the timer charging when the switch is operated within a predetermined period of time from when the lock mechanism is set to a locked state for the first time after the charging cable is connected to the inlet.

In the charging device, the electronic control unit may be configured to use the switch as a switch for causing the lock mechanism to lock the charging cable immediately after the charging cable is connected to the inlet, and the electronic control unit may be configured to control the charger such that the charger carries out the instant charging when the switch is not operated within a predetermined period of time from when the lock mechanism is set to a locked state for the first time after the charging cable is connected to the inlet.

In the charging device, the electronic control unit may be configured to use the switch as a switch for causing the lock mechanism to lock the charging cable immediately after the charging cable is connected to the inlet, and the electronic control unit may be configured to control the charger such that the charger carries out the instant charging when the switch is operated within a predetermined period of time from when the lock mechanism is set to a locked state for the first time after the charging cable is connected to the inlet.

In the charging device, the electronic control unit may be configured to use the switch as a switch for causing the lock mechanism to lock the charging cable immediately after the charging cable is connected to the inlet, and the electronic control unit may be configured to control the charger such that the charger carries out the timer charging when the switch is not operated within a predetermined period of time from when the lock mechanism is set to a locked state for the first time after the charging cable is connected to the inlet.

According to the invention, it is possible to increase the possibility that a failure on timer setting for charging is realized and to switch between enabled and disabled states of a timer in the flow of charging operation without any troublesome burden on a user.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
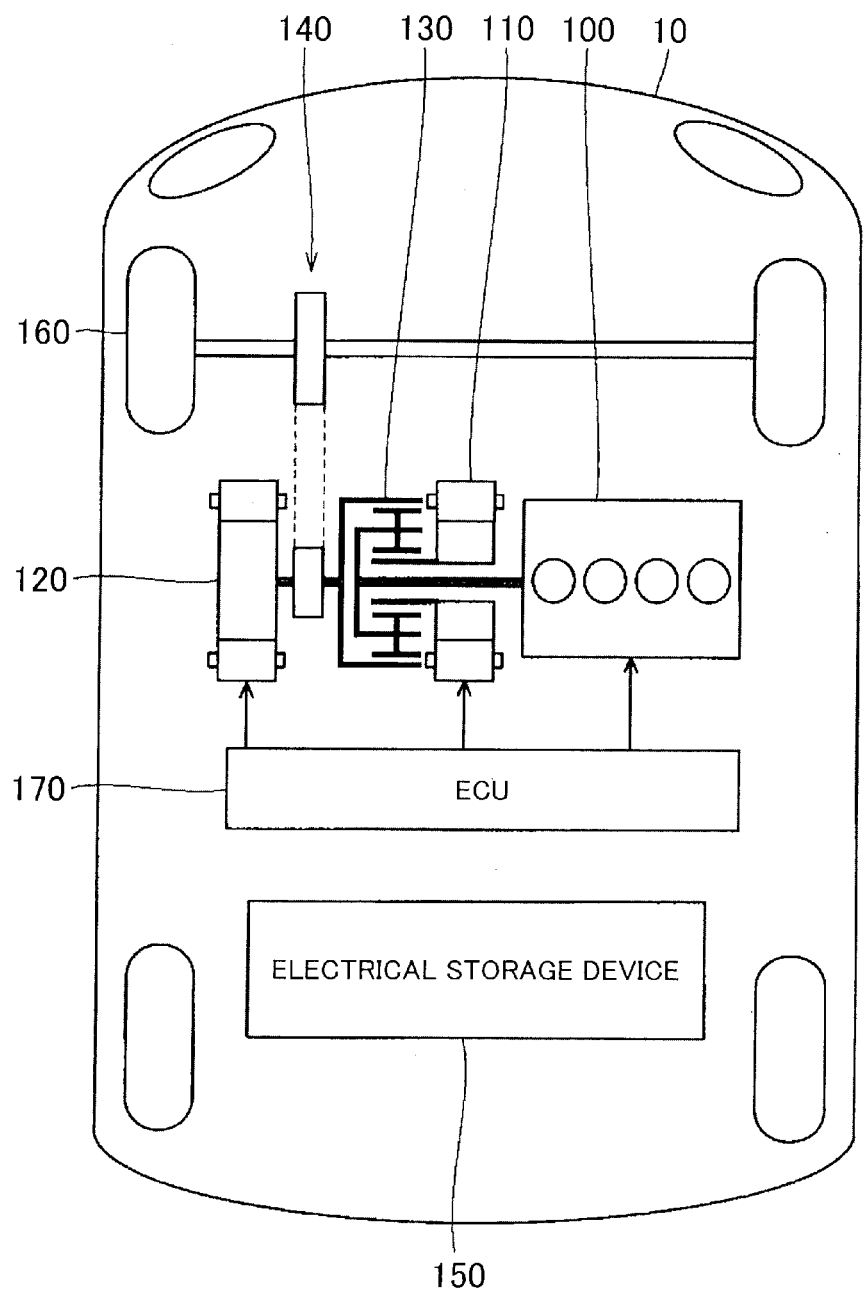
FIG. 1 is an overall block diagram of a hybrid vehicle that is shown as an example of a vehicle according to an embodiment of the invention.

Hereinafter, embodiments of the invention will be described in detail with reference to the accompanying drawings. Like reference numerals denote the same or corresponding components in the drawings, and the description thereof will not be repeated.

First, the configuration of an externally chargeable vehicle according to a first embodiment will be described. FIG. 1 is an overall block diagram of a hybrid vehicle that is shown as an example of the vehicle according to the embodiment of the invention. In the following description, the hybrid vehicle may be simply referred to as "vehicle". In addition, the hybrid vehicle is illustrative. The invention is also applicable to an electric vehicle, a fuel-cell vehicle, and the like, as long as an electrical storage device is mounted on the vehicle and the vehicle is configured to be chargeable from a device outside the vehicle.

As shown in FIG. 1, the hybrid vehicle 10 includes an engine 100, a motor generator (MG) 110, an MG 120, a power split mechanism 130, a speed reduction gear 140, an electrical storage device 150, drive wheels 160 and an electronic control unit (ECU) 170.

The engine 100, the MG 110 and the MG 120 are coupled to the power split mechanism 130. The hybrid vehicle 10 travels on driving force from at least one of the engine 100 and the MG 120. Power that is generated by the engine 100 is distributed between two routes by the power split mechanism 130. That is, one of the routes transmits power to the drive wheels 160 via the speed reduction gear 140, and the other one of the routes transmits power to the MG 110.

The engine 100 is an internal combustion engine that generates power by burning fuel, such as gasoline.

The MG 110 is an alternating-current rotary electric machine, and is, for example, a three-phase alternating-current synchronous motor that includes a U-phase coil, a V-phase coil and a W-phase coil. The MG 110 generates electric power by using the power of the engine 100, which is distributed by the power split mechanism 130. For example, when the state of charge (SOC) of the electrical storage device 150 becomes lower than a predetermined value, the engine 100 is started, and electric power is generated by the MG 110. Electric power generated by the MG 110 is converted by an inverter (described later) from alternating-current power to direct-current power. The direct-current power from the inverter is adjusted in voltage by a converter (described later), and is stored in the electrical storage device 150.

The MG 120 is an alternating-current rotary electric machine, and is, for example, a three-phase alternating-current synchronous motor that includes a U-phase coil, a V-phase coil and a W-phase coil. The MG 120 generates driving force by using at least one of electric power stored in the electrical storage device 150 and electric power generated by the MG 110. The driving force of the MG 120 is transmitted to the drive wheels 160 via the speed reduction gear 140. Thus, the MG 120 assists the engine 100 or the vehicle is caused to travel by using driving force from the MG 120. In FIG. 1, the drive wheels 160 are shown as front wheels. Alternatively, rear wheels instead of the front wheels or in addition to the front wheels may be driven.

For example, during braking of the vehicle, the MG 120 is driven by the drive wheels 160 via the speed reduction gear 140, and the MG 120 operates as a generator. Thus, the MG 120 operates as a regenerative brake that converts braking energy to electric power. Electric power generated by the MG 120 is stored in the electrical storage device 150.

The power split mechanism 130 includes a planetary gear unit that includes a sun gear, pinions, a carrier and a ring gear. The pinions are in mesh with the sun gear and the ring gear. The carrier supports the pinions such that the pinions are rotatable, and is coupled to a crankshaft of the engine 100. The sun gear is coupled to a rotary shaft of the MG 110. The ring gear is coupled to a rotary shaft of the MG 120 and the speed reduction gear 140.

The engine 100, the MG 110 and the MG 120 are coupled to one another via the power split mechanism 130 formed of the planetary gear unit. Thus, the rotation speeds of the engine 100, MG 110 and MG 120 have a relationship connected by a straight line in the nomograph.

The electrical storage device 150 is a chargeable and dischargeable direct-current power supply, and, for example, includes a secondary battery, such as a nickel metal hydride battery and a lithium ion battery. Not only electric power that is generated by the MG 110 and the MG 120 but also electric power that is supplied from a power supply outside the vehicle (described later) is stored in the electrical storage device 150.

A large-capacitance capacitor may also be employed as the electrical storage device 150. The electrical storage device 150 may be any device as long as the device is an electric power buffer that temporarily stores electric power generated by the MG 110 and the MG 120 or electric power from a power supply outside the vehicle and that is able to supply the stored electric power to the MG 120. In addition, the number of electrical storage devices mounted on the hybrid vehicle 10 is not specifically limited. Thus, the plurality of electrical storage devices may be mounted on the hybrid vehicle 10. The capacitance of each of the plurality of electrical storage devices may be substantially the same or may be different from each other.

The engine 100, the MG 110 and the MG 120 are controlled by the ECU 170. The ECU 170 may be divided into a plurality of ECUs function by function.

Figure 2:
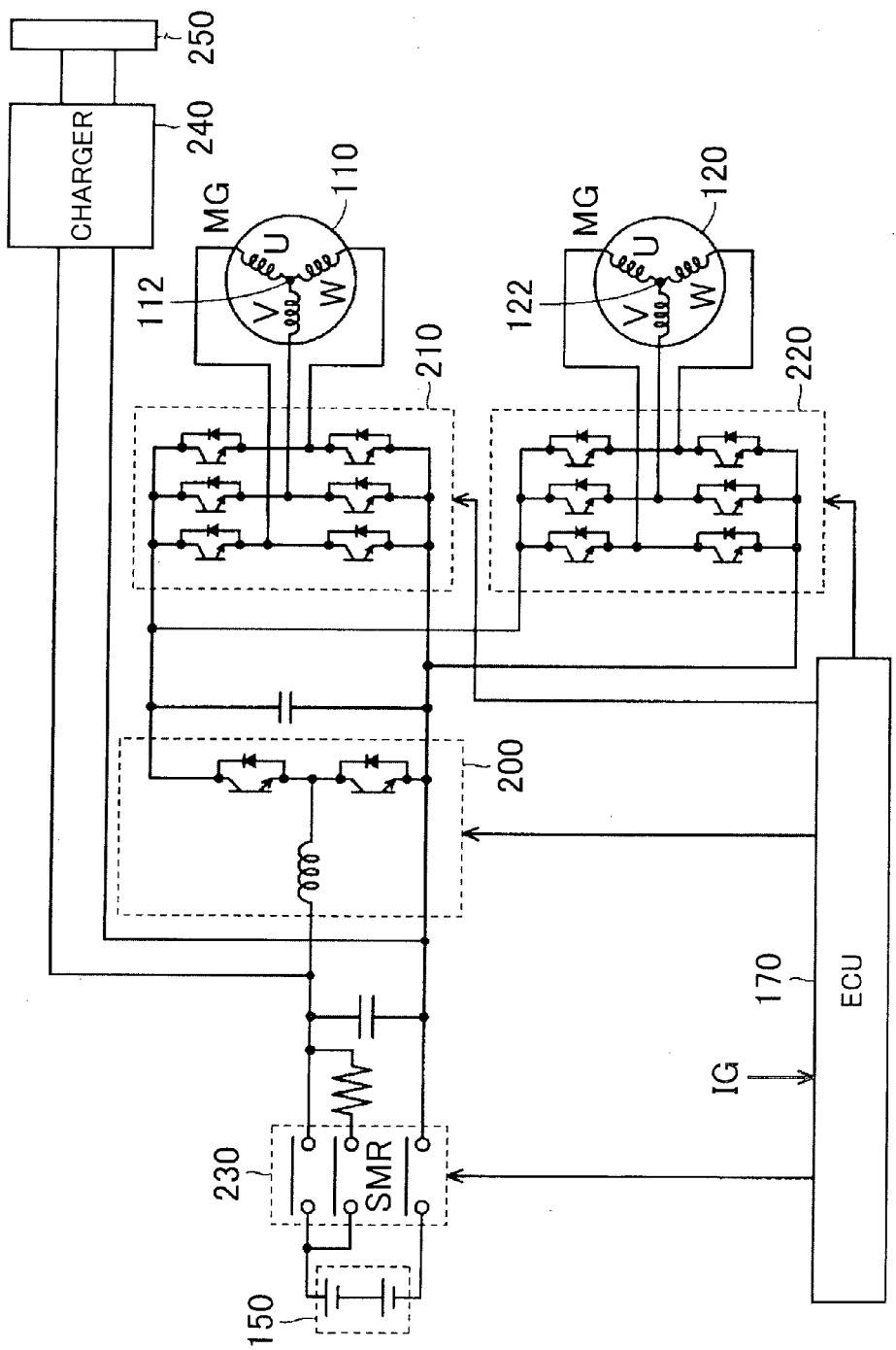
FIG. 2 is an overall configuration diagram of an electrical system for the hybrid vehicle according to the embodiment of the invention.

FIG. 2 is an overall configuration view of an electrical system of the hybrid vehicle according to the embodiment of the invention. As shown in FIG. 2, the hybrid vehicle 10 includes a converter 200, an inverter 210, an inverter 220, a system main relay (SMR) 230, a charger 240 and an inlet 250.

The converter 200 includes a reactor, two npn transistors and two diodes. One end of the reactor is connected to the positive electrode side of the electrical storage device 150, and the other end of the reactor is connected to a connection node between the two npn transistors. The two npn transistors are connected in series with each other, and each of the diodes is connected in reverse-parallel with a corresponding one of the npn transistors.

For example, an insulated gate bipolar transistor (IGBT) may be used as each npn transistor. In addition, instead of the npn transistor, a power switching element, such as a power metal oxide semiconductor field-effect transistor (power MOSFET), may be used.

When electric power discharged from the electrical storage device 150 is supplied to the MG 110 or the MG 120, the converter 200 steps up voltage supplied from the electrical storage device 150. On the other hand, when the electrical storage device 150 is charged with electric power generated by the MG 110 or the MG 120, the converter 200 carries out step-down operation.

Each of the inverters 210, 220 includes a U-phase arm, a V-phase arm and a W-phase arm. The U-phase arm, the V-phase arm and the W-phase arm are connected in parallel with one another. Each of the U-phase arm, the V-phase arm and the W-phase arm includes two npn transistors connected in series with each other. A diode is connected between the collector and emitter of each npn transistor, and flows current from the emitter side to the collector side.

The connection point between the two npn transistors in each arm of the inverter 210 is connected to an end portion corresponding to the arm and different from a neutral point 112 of stator coils of the MG 110. The connection point between the two npn transistors in each arm of the inverter 220 is connected to an end portion corresponding to the arm and different from a neutral point 122 of stator coils of the MG 120.

The inverter 210 converts direct current, which is supplied from the electrical storage device 150, to alternating current, and supplies the alternating current to the MG 110. In addition, the inverter 210 converts alternating current, generated by the MG 110, to direct current. The inverter 220 converts direct current, which is supplied from the electrical storage device 150, to alternating current, and supplies the alternating current to the MG 120. In addition, the inverter 220 converts alternating current, generated by the MG 120, to direct current.

The converter 200, the inverter 210 and the inverter 220 are controlled by the ECU 170.

The SMR 230 is provided between the electrical storage device 150 and the charger 240. The SMR 230 is switched between an open state and a closed state through control that is executed by the ECU 170. When the SMR 230 is in the open state, the electrical storage device 150 is electrically interrupted from the converter 200 and the charger 240. When the SMR 230 is in the closed state, the electrical storage device 150 is electrically connected to the converter 200 and the charger 240.

The inlet 250 is provided in the hybrid vehicle 10 in order to receive electric power that is supplied from an external power supply. The inlet 250 is configured to be connectable to a cable unit (not shown) for transferring electric power from the external power supply. When the inlet 250 is connected to the external power supply via the cable unit, the inlet 250 receives electric power that is supplied from the external power supply.

An output terminal of the charger 240 is connected between the electrical storage device 150 and the converter 200. The charger 240 converts alternating-current power, input to the inlet 250, to direct-current power, and supplies the direct-current power to the electrical storage device 150. When direct-current power from the charger 240 is supplied to the electrical storage device 150, the electrical storage device 150 is charged.

The ECU 170 receives a signal IG for starting up or stopping the electrical system shown in FIG. 2. When the signal IG is in an on state, the ECU 170 starts up the electrical system. On the other hand, when the signal IG is in an off state, the ECU 170 stops the electrical system. The signal IG is transmitted from a switch (not shown), which is operated by a user, to the ECU 170. The ECU 170 allows the charger 240 to operate when the signal IG is in the off state.

Figure 3:
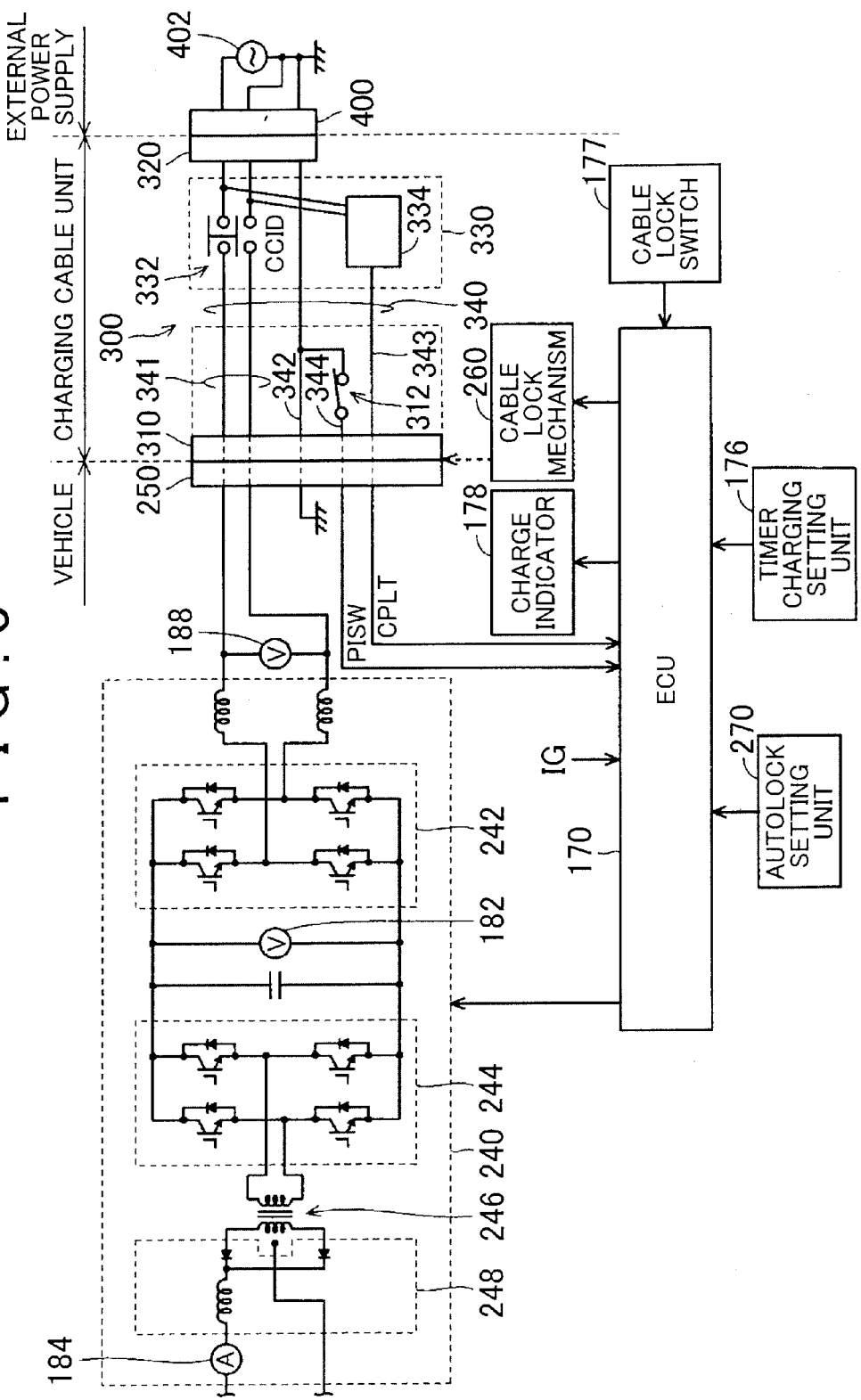
FIG. 3 is a view for illustrating a configuration for charging the hybrid vehicle from an external power supply according to the embodiment of the invention.

FIG. 3 is a view for illustrating a configuration for charging the hybrid vehicle from an external power supply according to the embodiment of the invention. As shown in FIG. 3, a charging system for charging the electrical storage device 150 of the hybrid vehicle 10 includes a charging cable unit 300, the inlet 250, the charger 240, the ECU 170, a timer charging setting unit 176, a switch 177 for locking the cable, a cable lock mechanism 260 and a charge indicator 178.

The charger 240 includes an AC/DC conversion circuit 242, a DC/AC conversion circuit 244, an isolation transformer 246 and a rectifying circuit 248.

The AC/DC conversion circuit 242 converts alternating-current power to direct-current power on the basis of a driving signal from the ECU 170. In addition, the AC/DC conversion circuit 242 functions as a step-up chopper circuit that steps up voltage by using a coil as a reactor. The DC/AC conversion circuit 244 converts direct-current power to high-frequency alternating-current power on the basis of a driving signal from the ECU 170 and outputs the alternating-current power to the isolation transformer 246.

The isolation transformer 246 includes cores, a primary coil and a secondary coil. Each core is formed of a magnetic material. The primary coil and the secondary coil are respectively wound around the cores. The primary coil and the secondary coil are electrically isolated from each other, and are respectively connected to the DC/AC conversion circuit 244 and the rectifying circuit 248. The isolation transformer 246 converts high-frequency alternating-current power, which is received from the DC/AC conversion circuit 244, to a voltage level based on the turns ratio of the primary coil and the secondary coil, and outputs the converted alternating-current power to the rectifying circuit 248. The rectifying circuit 248 rectifies alternating-current power, which is output from the isolation transformer 246, to direct-current power.

A voltage between the AC/DC conversion circuit 242 and the DC/AC conversion circuit 244 (a terminal voltage of a smoothing capacitor) is detected by a voltage sensor 182, and a signal indicating the detected result is input to the ECU 170. In addition, an output current of the charger 240 is detected by a current sensor 184, and a signal indicating the detected result is input to the ECU 170.

The ECU 170 may have not only the function of controlling the charger 240 but also the function of detecting a failure of the charger 240. For example, when the voltage that is detected by the voltage sensor 182 and/or the current that is detected by the current sensor 184 is higher than or equal to a threshold, a failure of the charger 240 has been detected.

The charging cable unit 300 is used to couple the hybrid vehicle 10 to a power supply 402. The charging cable unit 300 includes a connector 310, a plug 320, a charging circuit interrupt device (CCID) 330 and a cable 340. The cable 340 includes a power line pair 341, a ground line 342 and signal lines 343, 344.

The connector 310 is connected to the inlet 250 provided in the hybrid vehicle 10. A charging cable connection detection circuit 312 is, for example, a switch, and is provided in the connector 310. When the connector 310 is connected to the inlet 250, the switch enters the closed state, and a proximity detection signal PISW indicating a state where the connector 310 is connected to the inlet 250 is input to the ECU 170. That is, the charging cable connection detection circuit 312 is a signal generator that generates the proximity detection signal PISW.

The plug 320 is connected to an outlet 400 to which alternating-current power is supplied from the power supply 402. The outlet 400 is, for example, provided in a charging station.

The CCID 330 is inserted in the cable 340 (power line pair 341), and includes a relay 332 and a control pilot circuit 334. When the relay 332 is open, a route that supplies electric power from the power supply 402 outside the hybrid vehicle 10 to the hybrid vehicle 10 is interrupted. When the relay 332 is closed, it is allowed to supply electric power from the power supply 402 to the hybrid vehicle 10. When the connector 310 is connected to the inlet 250, the relay 332 is controlled by the ECU 170.

The control pilot circuit 334 operates on electric power that is supplied from the power supply 402 when the plug 320 is connected to the outlet 400. The control pilot circuit 334 generates a pilot signal CPLT. The pilot signal CPLT is transmitted to the ECU 170 of the vehicle via the signal line 343.

The control pilot circuit 334 oscillates the pilot signal CPLT at a prescribed duty cycle (the ratio of a pulse width to an oscillation period). The duty cycle is set on the basis of a rated current that is allowed to be supplied from the power supply 402 to the vehicle via the charging cable unit 300. The rated current is determined for each charging cable (power line pair). When the type of charging cable varies, the rated current also varies, so the duty cycle of the pilot signal CPLT also varies. The ECU 170 is able to detect the rated current, which is allowed to be supplied from the power supply 402 to the vehicle via the charging cable unit 300, by detecting the duty cycle of the pilot signal CPLT.

An alternating-current voltage of the power supply 402 is detected by the voltage sensor 188 provided inside the hybrid vehicle 10. The detected voltage is transmitted to the ECU 170.

In the present embodiment, when electric power output from the power supply 402 is supplied to the electrical storage device 150 via the charging cable unit 300, the electrical storage device 150 is charged. When the electrical storage device 150 is charged, the SMR 230 and the relay 332 in the CCID 330 are closed, and the charger 240 operates such that electric power from the power supply 402 is supplied to the electrical storage device 150.

Figure 4:
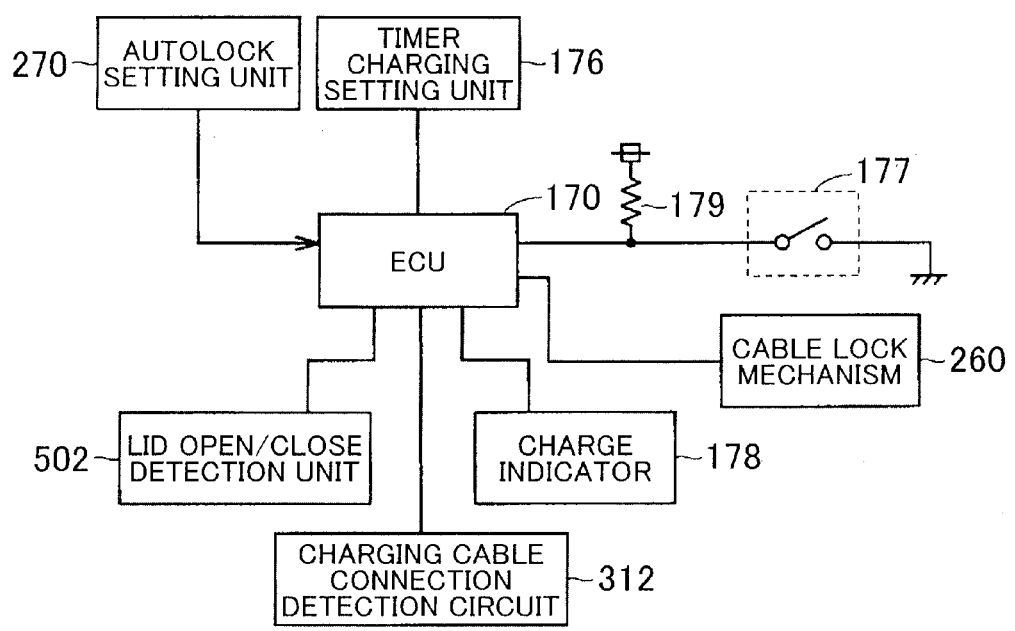
FIG. 4 is a schematic view for illustrating the relationship between a cable lock switch and an ECU shown in FIG. 3.

Next, an operation regarding timer charging will be described. FIG. 4 is a schematic view for illustrating the relationship between a cable lock switch and the ECU. As shown in FIG. 4, the cable lock mechanism 260 is a mechanism for locking the charging cable such that the charging cable is connected to the inlet and is not disconnected. The ECU 170 receives signals from an autolock setting unit 270, the timer charging setting unit 176, the charging cable connection detection circuit 312, a lid open/close detection unit 502 and the switch 177. In addition, the ECU 170 controls the charge indicator 178 and the cable lock mechanism 260. The switch 177 is used in order to actuate the cable lock mechanism 260. In addition, the switch 177 is also used in order to enable or disable charging start time set by the timer charging setting unit 176.

When the switch 177 is in the off state, a high-level signal is input to the ECU 170 because of a pull-up resistor 179. When the switch 177 is in the on state, a low-level signal is input to the ECU 170.

In FIG. 4, the polarity of the on/off state of the switch may be inverted. In addition, in FIG. 4, the pull-up resistor 179 is provided. However, it is also applicable that a pull-down resistor is connected instead of the pull-up resistor 179 and the configuration is changed such that a power supply potential Vcc is supplied instead of a ground potential when the switch is in the on state.

Figure 5:
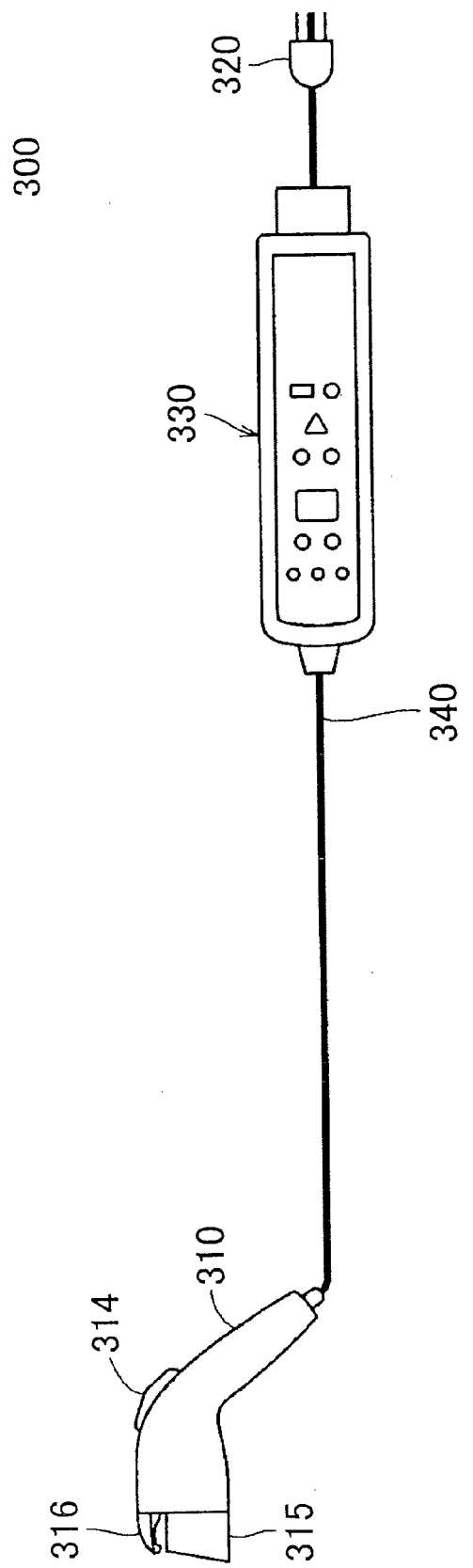
FIG. 5 is an external appearance of a charging cable unit shown in FIG. 3.

FIG. 5 is an external appearance of the charging cable unit. As shown in FIG. 5, the charging cable unit 300 includes the connector 310, the plug 320, the CCID 330 and the cable 340. The connector 310 includes a release button 314, a fitting portion 315 that is fitted to the inlet 250 of the vehicle, and an engaging portion 316.

The fitting portion 315 has a plurality of terminals (not shown). when the fitting portion 315 is inserted into the inlet 250 of the hybrid vehicle 10, the power line pair and signal line of the charging cable unit are connected to the vehicle. The engaging portion 316 is used to fix the connector 310 in a state where the connector 310 is connected to the inlet 250 of the vehicle. The engaging portion 316 moves in response to operation of the release button 314.

Figure 6:
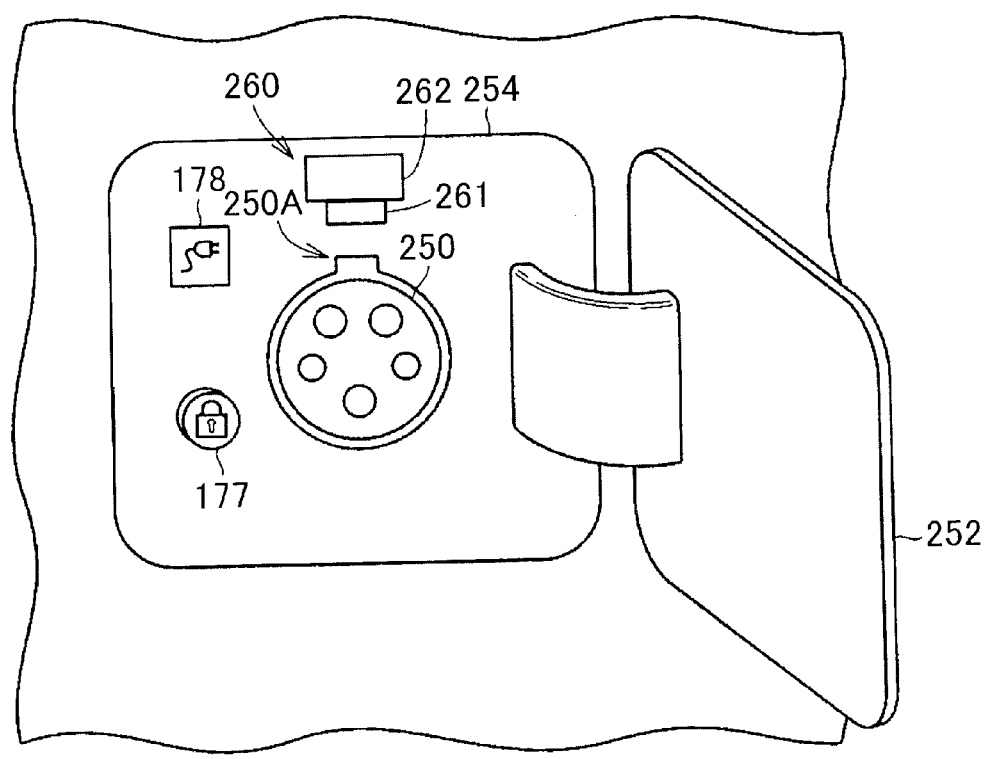
FIG. 6 is a view that shows the configuration of an inlet accommodating portion in which an inlet shown in FIG. 3 is accommodated.

FIG. 6 is a view that shows the configuration of an inlet accommodating portion in which the inlet is accommodated. As shown in FIG. 6, the inlet accommodating portion 254 is normally covered with a charging lid 252 and is invisible from the outside. The inlet accommodating portion 254 accommodates the inlet 250, the charge indicator 178, the switch 177 for locking the charging cable, a body portion 262 and bar 261 of the cable lock mechanism 260 inside the charging lid 252.

A pushbutton switch is illustrated as the switch 177 in FIG. 6; instead, a noncontact switch, such as a proximity switch, may be used.

As shown in FIG. 4 and FIG. 6, the timer charging setting unit 176, for example, includes an input button or a touch panel, and allows charging start time or charging end time to be input. The above timer charging setting unit 176 is desirably, for example, installed near a driver seat inside a vehicle cabin because cost increases if a waterproof component is used. For example, a touch panel of a car navigation system, a meter panel, a mobile terminal, or the like, can operate as the timer charging setting unit 176.

In contrast to this, although a location is not specifically limited as long as the charge indicator 178 can be seen at the time when the charging cable is inserted into the inlet 250. The charge indicator 178 is desirably installed near the inlet 250 so as to be easily visually recognizable from the outside of the vehicle. In addition, the switch 177 for locking the charging cable is mostly operated immediately after the charging cable is connected to the inlet, so the switch 177 is installed near the inlet 250.

Here, assuming the case where the charging cable is connected to the inlet 250 outside the vehicle in order to charge the vehicle while timer setting is erroneously set, if the timer charging setting unit 176 inside the vehicle cabin needs to be, operated in order to cancel the timer setting, it is very inconvenient because the user needs to return into the vehicle cabin again.

In addition, depending on the way of user's usual usage of the vehicle, it may be assumed that operation for cancelling timer setting is rarely performed. In such a case, even when the cancelling switch has a failure, the user is hard to realize the failure, and it is presumable that the user does not find the failure until the user intends to carry out instant charging by operating the switch.

In the present embodiment, focusing on the point that the switch for cancelling timer setting is arranged at a location at which the switch is easily operated. outdoor and the point that a switch that is frequently used and of which a failure is immediately easily realized also serves as the cancelling switch, the switch 177 for locking the charging cable also serves as the switch for cancelling timer setting.

Figure 7:
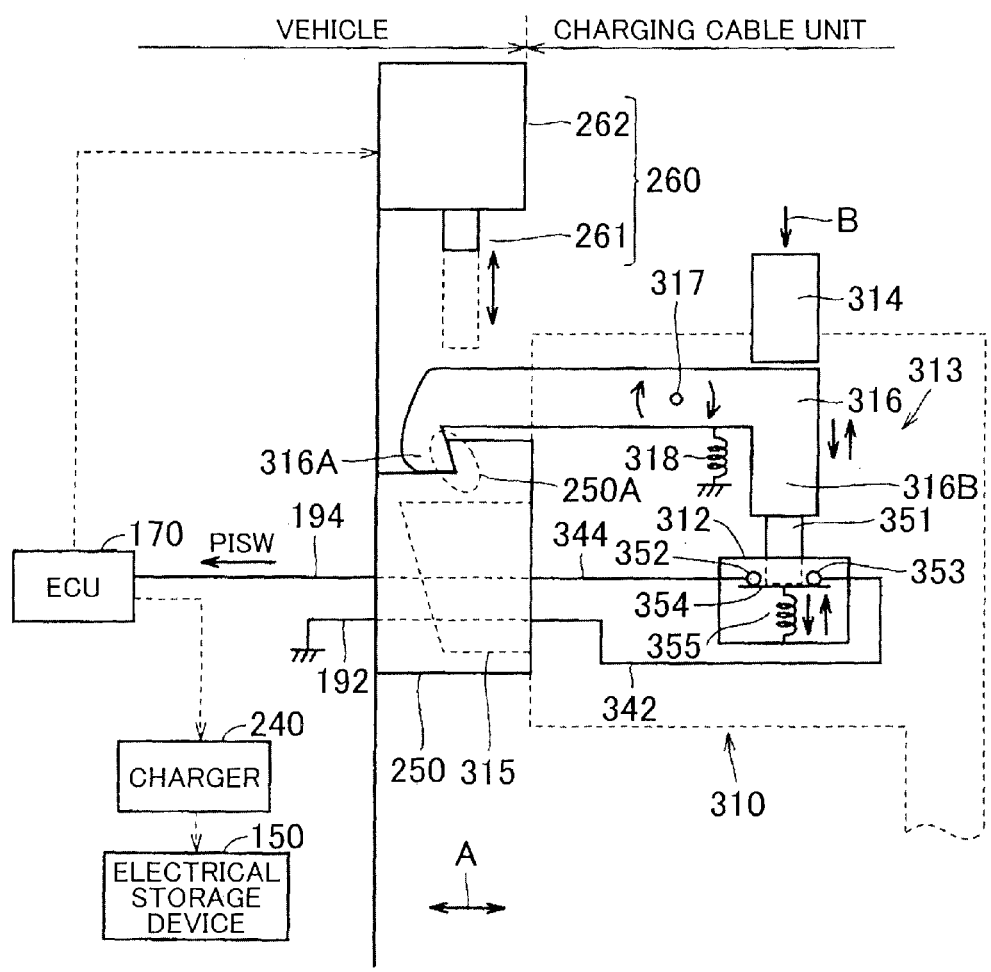
FIG. 7 is a configuration view for illustrating a configuration relating to connection of a connector of the charging cable unit shown in FIG. 3 with the inlet of the vehicle.

FIG. 7 is a configuration view for illustrating a configuration relating to connection of the connector of the charging cable unit with the inlet of the vehicle. As shown in FIG. 7, the connector 310 includes the fitting portion 315, a latch mechanism 313, the release button 314, the charging cable connection detection circuit 312, the ground line 342 and the signal line 344.

For the sake of convenience of description, the power line pair 341 is not shown in FIG. 7. The latch mechanism 313 includes the engaging portion 316, a rotary shaft 317 connected to the engaging portion 316, and a spring 318 connected to the engaging portion 316. A step 250A is formed in the inlet 250. The engaging portion 316 includes a hook-shaped distal end portion 316A and a rear end portion 316B. The rotary shaft 317 extends in a direction perpendicular to a direction (direction indicated by the arrow A in the drawing) in which the fitting portion 315 is connected to or disconnected from the inlet 250.

The charging cable connection detection circuit 312 includes a button 351, a terminal 352 connected to the signal line 344, a terminal 353 connected to the ground line 342, a movable piece 354 for connecting the terminals 352, 353 to each other, and a spring 355 for moving the movable piece 354.

When the connector 310 is connected to the inlet 250 of the vehicle, the fitting portion 315 is inserted in the inlet 250. Furthermore, the distal end portion 316A of the engaging portion 316 engages with the step 250A formed in the inlet 250. Thus, the connector 310 is allowed to be fixed in a state where the connector 310 is connected to the inlet 250. Through the operation to press the release button 314 along the arrow B direction, the distal end portion 316A of the engaging portion 316 moves away from the inlet 250. Thus, the engaging portion 316 is released from a state where the engaging portion 316 is engaged with the inlet 250.

The button 351 of the charging cable connection detection circuit 312 is pressed by the rear end portion 316B of the engaging portion 316. The charging cable connection detection circuit 312 enters the open state when the button 351 is pressed; whereas the charging cable connection detection circuit 312 enters the closed state when the button 351 is not pressed. When the button 351 is not pressed, the movable piece 354 contacts the terminal 352 and the terminal 353 due to the spring 355. Thus, the charging cable connection detection circuit 312 enters the closed state. On the other hand, when the button 351 is pressed, the movable piece 354 is moved away from the terminal 352 and the terminal 353 due to the button 351. Thus, the charging cable connection detection circuit 312 enters the open state.

The vehicle includes the cable lock mechanism 260 that is actuated through control from the ECU 170. The cable lock mechanism 260 includes the bar 261 and the body portion 262 for moving the bar 261. When the cable lock mechanism 260 is actuated, the body portion 262 causes the bar 261 to protrude into the state indicated by the dashed line. In a state where the bar 261 is protruded, movement of the engaging portion 316 is inhibited, so the charging cable is not disconnected from the inlet 250. In addition, the cable lock mechanism 260 releases lock of the cable through control from the ECU 170. In this case, the body portion 262 pulls and returns the bar 261 to the state indicated by the solid line. A direction in which the bar 261 moves is a direction perpendicular to the direction (that is, the direction indicated by the arrow A in the drawing) in which the fitting portion 315 is connected to or disconnected from the inlet 250.

Furthermore, the vehicle includes the ground line 192 connected to the ground line 342 of the connector 310 and the signal line 194 connected to the signal line 344 of the connector 310. When the signal line 194 is connected to the signal line 344, the signal PISW is transmitted from the connector 310 to the ECU 170.

The user is allowed to set whether to apply autolock to actuation of the cable lock mechanism with the use of the autolock setting unit 270 shown in FIG. 4. While autolock is applied, when the user connects the cable to the inlet, the cable lock mechanism is automatically actuated, and the charging cable is placed in a state where the charging cable is not disconnected from the inlet. The autolock setting unit 270 does not always need to be provided, and the charging system to which autolock is applied or a system to which no autolock is applied may be determined by setting at the time of designing a product or in a factory as needed.

Figure 8:
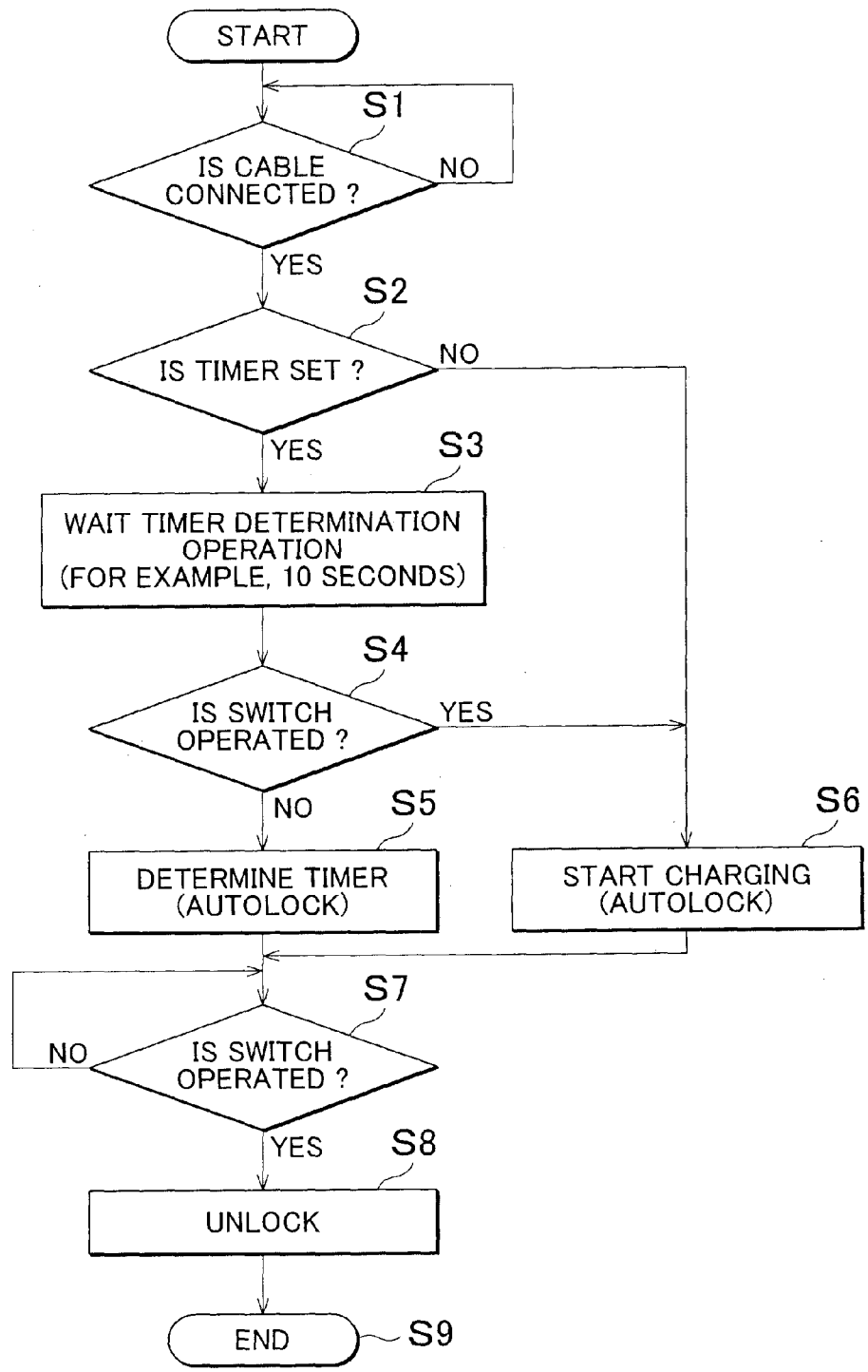
FIG. 8 is a flowchart for illustrating control for switching between enabled and disabled states of a timer according to a first embodiment.

FIG. 8 is a flowchart for illustrating control for switching between the enabled and disabled states of the timer according to the first embodiment. This process is a process in the case where autolock is set. As shown in FIG. 8, initially, when the process is started, the ECU 170 determines in step S1 whether the charging cable is connected. The ECU 170 is able to acquire whether the cable is connected on the basis of the signal PISW or the signal CPLT.

When cable connection has not been detected in step S1, the process remains in step S1, and enters a detection waiting state. In step S1, when cable connected has been detected, the ECU 170 proceeds with the process to step S2.

In step S2, the ECU 170 determines whether the charging start time of the timer has been set by the timer charging setting unit 176 shown in FIG. 4 in advance. When the timer has not been set in step S2, the process proceeds to step S6, the cable is locked by the cable lock mechanism 260 due to autolock operation, and charging is immediately started.

On the other hand, when the charging start time of the timer has been set in step S2, the process proceeds to step S3. In step S3, timer determination operation is waited for a predetermined period of time. The predetermined period of time is, for example, 10 seconds, and may be adjusted as needed. With this waiting time, charging is not started immediately for a while after the charging cable is connected to the inlet 250, so the number of times the relay in the charging route is operated does not need to be increased unnecessarily, and it is possible to extend the life of the relay.

Subsequently, in step S4, it is determined whether the switch 177 is operated within the predetermined period of time during which timer determination operation is waited in step S3. When it is determined in step s4 that the switch 177 is operated, the process proceeds to step S6, the cable is locked by the cable lock mechanism 260 due to autolock operation, and charging is immediately started.

On the other hand, when it is determined in step S4 that the switch 177 is not operated within the predetermined period of time, the process proceeds to step S5, the cable is locked by the cable lock mechanism 260 due to autolock operation, and the ECU 170 enables timer setting and enters a standby state without charging until the set charging start time comes.

After the process of step S5 or step S6, the switch 177 operates as a cable unlock switch for unlocking the cable. That is, in step S7, detection of operation of the switch 177 is waited and, when the operation has been detected, the process proceeds to step S8, and the ECU 170 executes control for causing the cable lock mechanism 260 to unlock the cable, after which the process ends in step S9. Desirably, charging is also stopped in the case where the cable is unlocked.

The characteristic of the process at the time when autolock is applied as shown in FIG. 8 is that the cable lock mechanism 260 is in a lock released state (unlocked state) before timer determination and the switch 177 operates as an instant charging switch when the cable lock mechanism 260 is in the unlocked state. In addition, even when the switch 177 is operated in a state where the charging cable is not connected to the inlet 250, it may be recognized that instructions for instant charging (timer cancellation) have been input. In this case, specification of timer cancellation may be, cancelled unless the cable is connected within the predetermined period of time (for example, one minute).

Next, the case where the switch 177 has a failure will be considered. In the process shown in FIG. 8, when the switch 177 has a failure, instant charging (timer cancellation) does not work, and the charging cable cannot be unlocked. Unlocking of the charging cable is conventionally mostly disabled in the case where the vehicle is controlled so as not to be allowed to travel in order to prevent drag of the cable. Thus, the user is able to immediately realize the failure of the switch 177.

When the switch 177 has a failure, it is conceivable to allow the vehicle to travel to a repair shop by designing the vehicle such that the cable is allowed to be forcibly unlocked. In this case, because of a state where it is not possible to normally unlock the cable or carry out instant charging, autolock and timer setting should be controlled to a disabled state at the time of forcible unlocking.

When such a forcible unlocking process has been executed three times successively during charging, autolock and timer setting may be controlled to the disabled state thereafter even when forcible unlocking is not carried out. In such a case, the possibility that the switch 177 has a failure is informed, timer setting is disabled and instant charging is enabled. Thus, it is possible to avoid inconvenience that it is not possible to carry out instant charging.

However, it is difficult to strictly distinguish user's forcing unlocking operation (erroneous operation at the time when the system is normal) from a failure of the switch 177, so it is desirable that a failure be not recorded and timer setting is recovered to the enabled state at the timing at which operation of the switch 177 has been recognized by the ECU 170.

Figure 9:
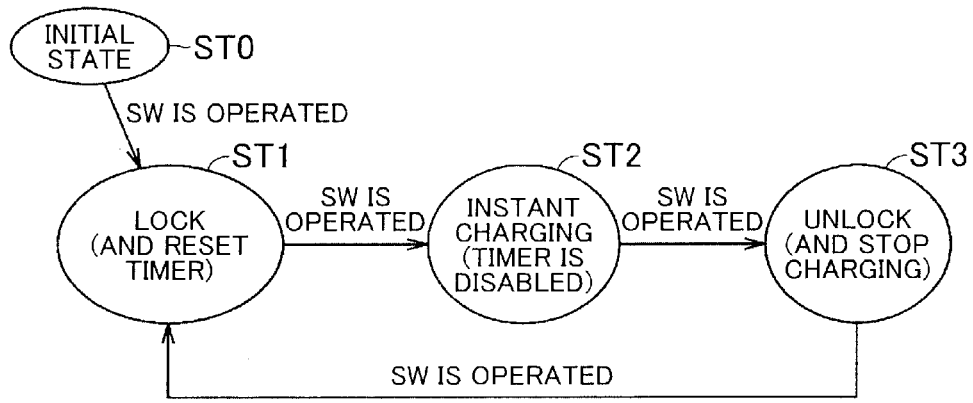
FIG. 9 is a view for illustrating a state transition in the case where autolock is not set and the timer is set in the control according to the first embodiment.

Subsequently, the case where autolock is not set will be described. FIG. 9 is a view for illustrating a state transition in the case where autolock is not set and the timer is set.

As shown in FIG. 9, when the switch 177 is operated in an initial state ST0, a transition into a state ST1 occurs, the cable lock mechanism 260 is actuated and is set in a cable locked state. In the state ST1, when operation of the switch 177 has been further detected, a transition into a state ST2 occurs. In the state ST2, timer setting is disabled, and instant charging is started. In the state ST2, when operation of the switch 177 has been further detected, a transition into a state ST3 occurs. In the state ST3, the cable lock mechanism 260 is changed into an unlocked state. In the state ST3, when operation of the switch 177 has been further detected, a transition into the state ST1 occurs.

At this time, the ECU 170 may execute control such that the timer is reset (the timer is enabled) in the state ST1 in response to operation of the switch 177 as a trigger, timer setting is disabled in the state ST2 and charging is stopped in the state ST3. However, stopping of charging and resetting of the timer may use inserting or disconnecting the cable to or from the inlet 250 as a trigger.

Figure 10:
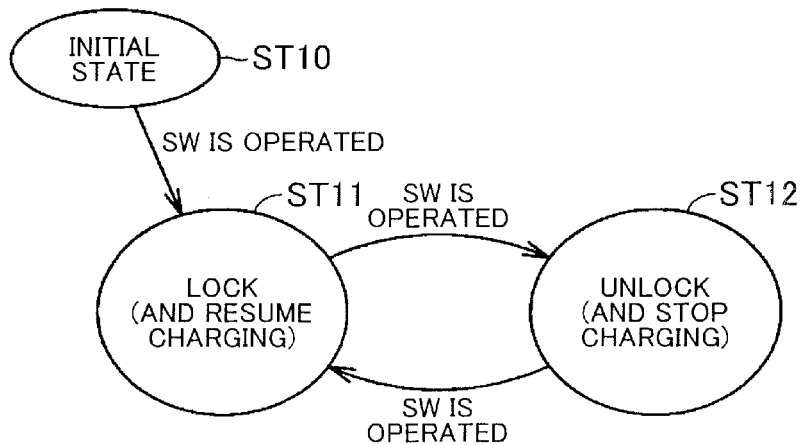
FIG. 10 is a view for illustrating a state transition in the case where autolock is not set and the timer is not set in the control according to the first embodiment.

FIG. 10 is a view for illustrating a state transition in the case where autolock is not set and the timer is not set. As shown in FIG. 10, when the switch 177 is operated in an initial state ST10, a transition into a state ST11 occurs, and the cable lock mechanism 260 is actuated and is set in a cable locked state. In the state ST11, when operation of the switch 177 has been further detected, a transition into a state ST12 occurs. In the state ST12, the cable lock mechanism 260 is changed into an unlocked state. In the state ST12, when operation of the switch 177 has been further detected, a transition into the state ST11 occurs.

At this time, charging may be started (resumed when temporarily interrupted) in the state ST11 in synchronization with operation of the switch 177. However, the switch 177 may not be directly used as a trigger for starting or stopping charging. A connection detection signal of the charging cable may be used as a trigger.

Figure 11:
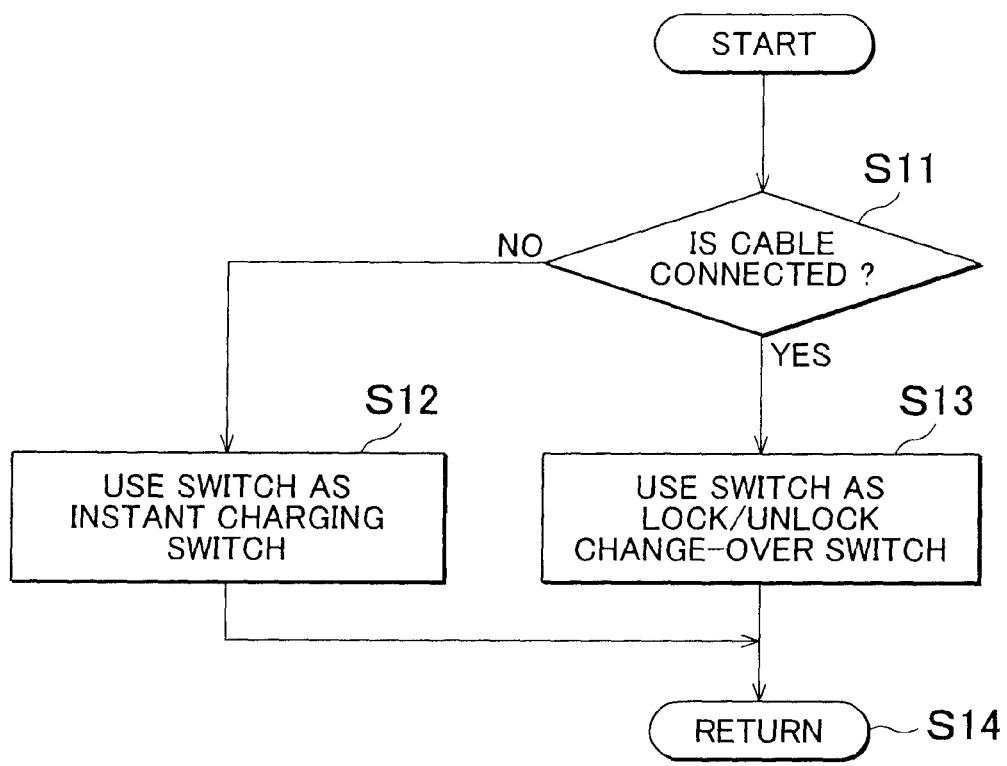
FIG. 11 is a flowchart for illustrating how the ECU uses the switch in different ways according to an alternative embodiment to the first embodiment.

FIG. 11 is a flowchart for illustrating how the ECU uses the switch in different ways according to an alternative embodiment to the first embodiment. As shown in FIG. 4, FIG. 6 and FIG. 11, initially, when the process, is started, the ECU 170 determines in step S11 whether the charging cable is connected to the inlet 250. The ECU 170 is able to determine whether the charging cable unit 300 is connected on the basis of the state of the signal PISW or the signal CPLT shown in FIG. 3.

When it is determined in step S11 that the charging cable unit 300 is not connected to the inlet 250, the process proceeds to step S12, and the ECU 170 uses the switch 177 as an instant charging switch (switch for disabling timer setting).

When it is determined in step S11 that the charging cable unit 300 is connected to the inlet 250, the process proceeds to step S13. In step S13, the ECU 170 uses the switch 177 as a lock/unlock change-over switch.

After the process of step S12 or step S13 is executed, the process proceeds to step S14, and the process is returned to a main routine.

As described above, the use of the switch 177 may be changed on the basis of whether the charging cable is connected to the inlet.

Next, a second embodiment will be described. In the first embodiment, an example in which the cable lock switch is also used as the timer cancellation switch is described. In this case, the charging system is designed or set so as to carry out timer charging when the time of the timer is set unless otherwise specified.

However, it is presumable that, depending on the user, a frequency at which timer charging is carried out is low. In the second embodiment, the case where the charging system is designed or set so as not to carry out timer charging even when the time of the timer is set unless otherwise specified and so as to carry out timer charging only when operation to enable the timer is performed will be described. In such a case, a switch for enabling the timer (hereinafter, referred to as timer determination switch) is required instead of the timer cancellation switch.

The configurations shown in FIG. 1 to FIG. 5 are also the same in the second embodiment. However, the way of usage of the switch 177 regarding timer setting is different.

Figure 12:
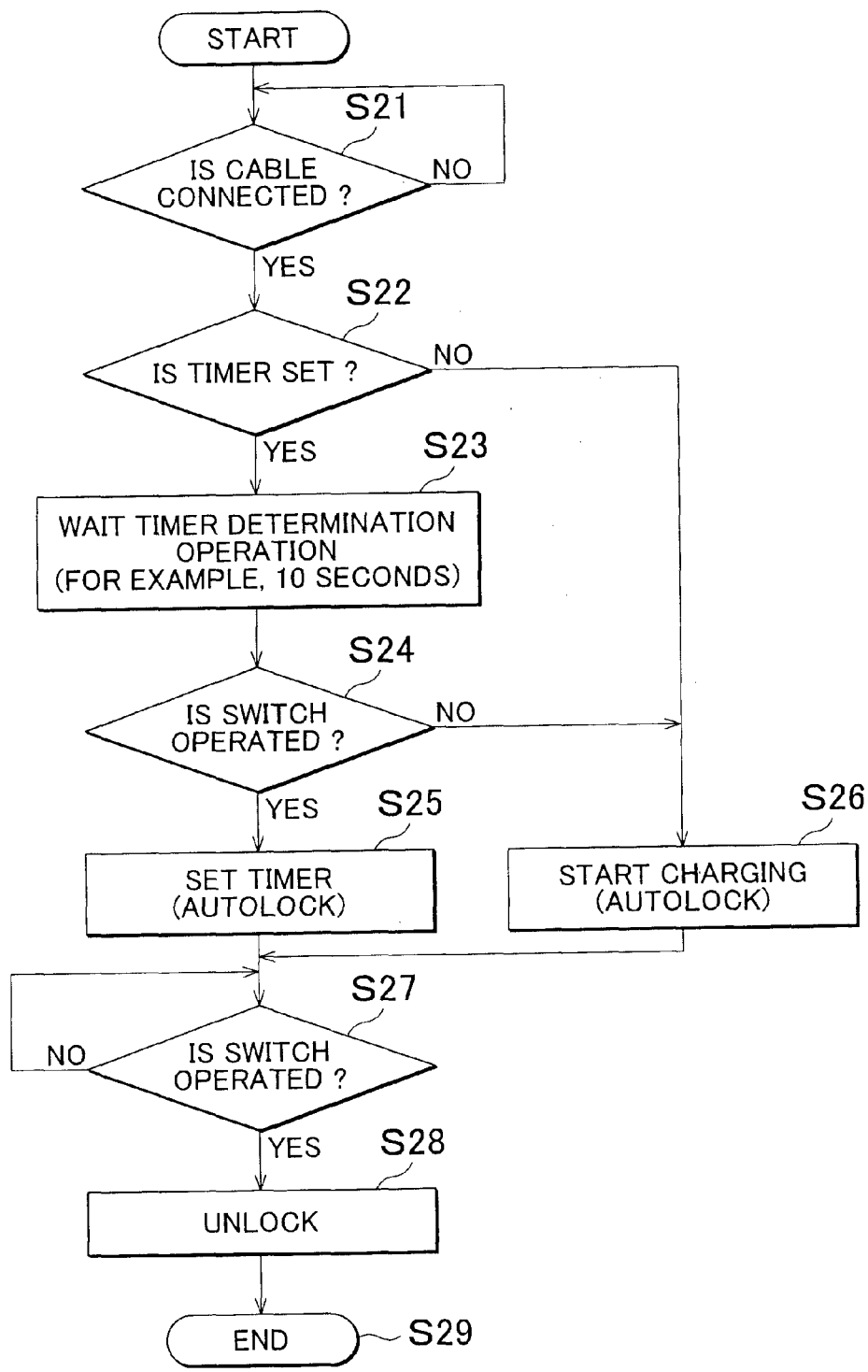
FIG. 12 is a flowchart for illustrating control for switching between the enabled and disabled states of the timer according to a second embodiment.

FIG. 12 is a flowchart for illustrating control for switching between the enabled and disabled states of the timer according to the second embodiment. This process is a process in the case where autolock is set. As shown in FIG. 12, initially, when the process is started, the ECU 170 determines in step S21 whether the charging cable is connected. The ECU 170 is able to acquire whether the cable is connected on the basis of the signal PISW or the signal CPLT.

When cable connection has not been detected in step S21, the process remains in step S21, and enters a detection waiting state. In step S21, when cable connection has been detected, the ECU 170 proceeds with the process to step S22.

In step S22, the ECU 170 determines whether the charging start time of the timer has been set by the timer charging setting unit 176 shown in FIG. 4 in advance. When the timer has not been set in step S22, the process proceeds to step S26, the cable is locked by the cable lock mechanism 260 due to autolock operation, and charging is immediately started.

On the other hand, when the charging start time of the timer has been set in step S22, the process proceeds to step S23. In step S23, timer determination operation is waited for a predetermined period of time. The predetermined period of time is, for example, 10 seconds, and may be adjusted as needed. With this waiting time, charging is not started immediately for a while after the charging cable is connected to the inlet 250, so the number of times the relay in the charging route is operated does not need to be increased unnecessarily, and it is possible, to extend the life of the relay.

Subsequently, in step S24, it is determined whether the switch 177 is operated within the predetermined period of time during which timer determination operation is waited in step S23. When the switch 177 is not operated in step S24, the process proceeds to step S26, the cable is locked by the cable lock mechanism 260 due to autolock operation, and charging is immediately started.

On the other hand, when the switch 177 is operated within the predetermined period of time in step S24, the process proceeds to step S25, the cable is locked by the cable lock mechanism 260 due to autolock operation, the ECU 170 enables timer setting to determine timer operation and is set in a standby state without charging until the set charging start time comes.

After the process of step S25 or step S26, the switch 177 operates as a cable unlock switch for unlocking the cable. That is, in step S27, detection of operation of the switch 177 is waited and, when the operation has been detected, the process proceeds to step S28, and the ECU 170 executes control for causing the cable lock mechanism 260 to unlock the cable, after which the process ends in step S29. Desirably, charging is also stopped in the case where the cable is unlocked.

The characteristic of the process at the time when autolock is applied as shown in FIG. 12 is that the cable lock mechanism 260 is in a lock released state (unlocked state) before timer determination and the switch 177 operates as a timer determination switch when the cable lock mechanism 260 is in the unlocked state. In addition, even when the switch 177 is operated in a state where the charging cable is not connected to the inlet 250, it may be recognized that instructions for timer determination have been input. In this case, specification of timer determination may be cancelled unless the cable is connected within the predetermined period of time (for example, one minute).

Next, the case where the switch 177 has a failure will be considered. In the process shown in FIG. 12, when the switch 177 has a stuck-ON failure, instant charging (timer cancellation) does not work, and the charging cable is unlocked, with the result that charging cannot be carried out. Such a failure should be detected and the user should be informed of the fact that charging cannot be carried out. Because charging is disabled, the user is able to immediately realize the failure of the switch 177. In a stuck-OFF failure of the switch 177, timer operation cannot be carried out; however, in this case, charging is allowed, so the disadvantage of the user is smaller than that in the stuck-ON failure.

Figure 13:
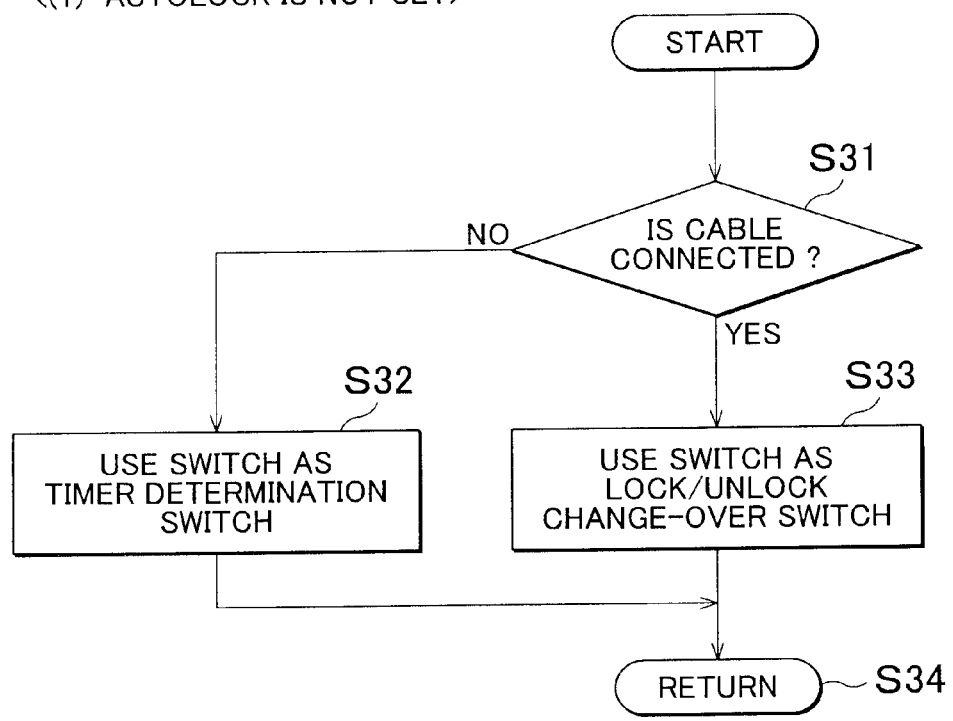
FIG. 13 is a flowchart for illustrating a first example of a process in the case where autolock is not set in the control according to the second embodiment and how the ECU uses the switch in different ways.

Subsequently, the case where autolock is not set will be described. FIG. 13 is a flowchart for illustrating a first example of a process in the case where autolock is not set and how the ECU uses the switch in different ways. As shown in FIG. 4, FIG. 6 and FIG. 13, initially, when the process is started, the ECU 170 determines in step S31 whether the charging cable is connected to the inlet 250. The ECU 170 is able to determine whether the charging cable unit 300 is connected on the basis of the state of the signal PISW or the signal CPLT shown in FIG. 3.

When it is determined in step S31 that the charging cable unit 300 is not connected to the inlet 250, the process proceeds to step S32, and the ECU 170 uses the switch 177 as a timer determination switch ('switch for enabling timer setting).

When it is determined in step S31 that the charging cable unit 300 is connected to the inlet 250, the process proceeds to step S33. In step S33, the ECU 170 uses the switch 177 as a lock/unlock change-over switch.

After the process of step S32 or step S33 is executed, the process proceeds to step S34, and the process is returned to a main routine.

As described above, the use of the switch 177 may be changed on the basis of whether the charging cable is connected to the inlet.

Furthermore, as will be described below with reference to FIG. 14, the switch 177 may be used as the timer determination switch only when timer determination operation is waited and may be used as a lock/unlock change-over switch after timer determination operation or after starting charging. In this case, switch operation should be ignored before cable connection.

Figure 14:
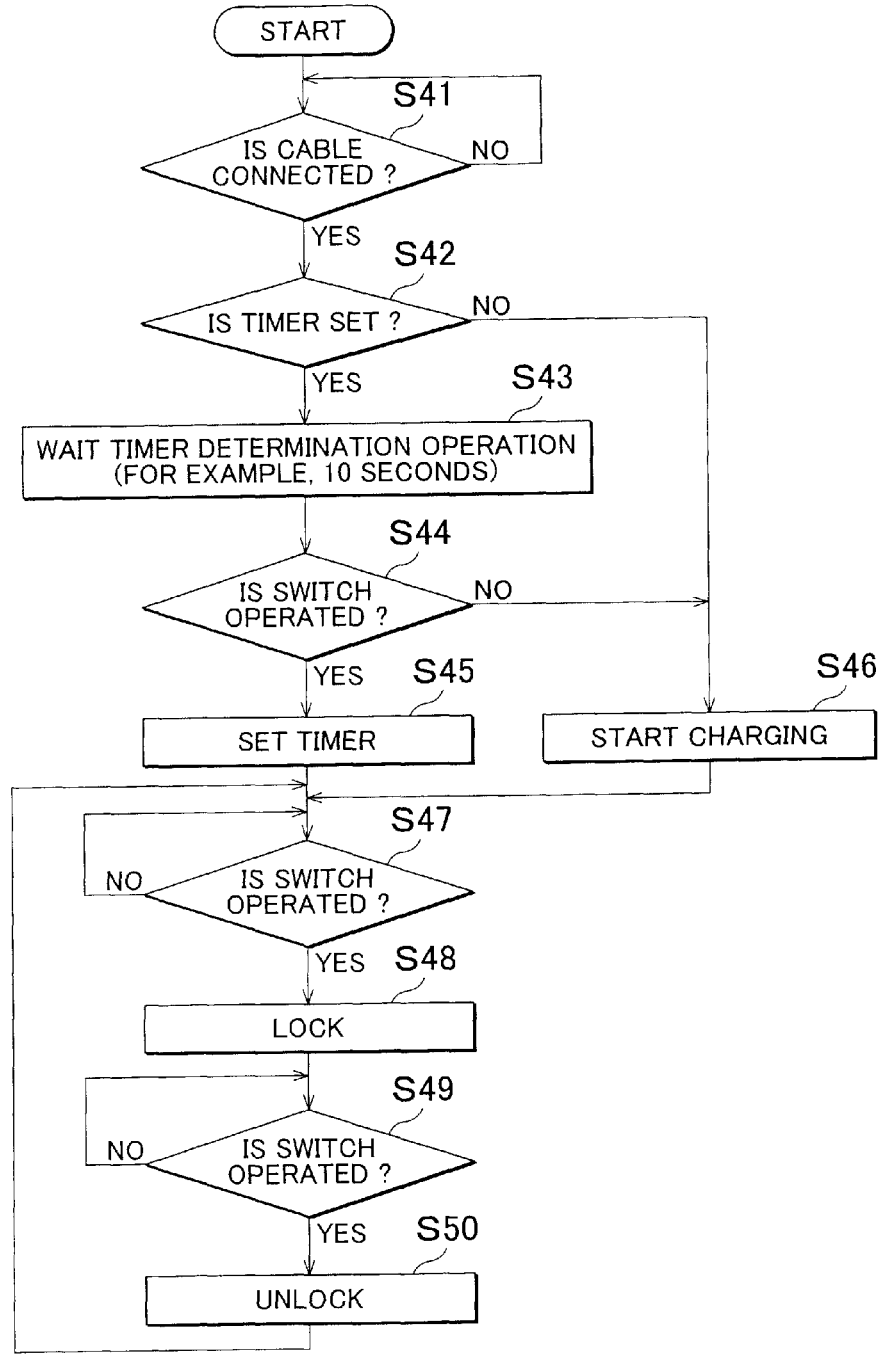
FIG. 14 is a flowchart for illustrating a second example of a process in the case where autolock is not set in the control according to the second embodiment and how the ECU uses the switch in different ways.

FIG. 14 is a flowchart for illustrating a second example of a process in the case where autolock is not set and how the ECU uses the switch in different ways. As shown in FIG. 4, FIG. 6 and FIG. 14, initially, when the process is started, the ECU 170 determines in step S41 whether the charging cable is connected to the inlet 250. The ECU 170 is able to acquire whether the cable is connected on the basis of the signal PISW or the signal CPLT.

When cable connection has not been detected in step S41, the process remains in step S41, and enters a detection waiting state. In step S41, when cable connection has been detected, the ECU 170 proceeds with the process to step S42.

In step S42, the ECU 170 determines whether the charging start time of the timer is set by the timer charging setting unit 176 shown in FIG. 4 in advance. When the timer has not been set in step S42, the process proceeds to step S46, and the timer setting is disabled such that charging is instantly started.

On the other hand, when the charging start time of the timer has been set in step S42, the process proceeds to step S43. In step S43, timer determination operation is waited for a predetermined period of time. The predetermined period of time is, for example, 10 seconds, and may be adjusted as needed. With this waiting time, charging is not started immediately for a while after the charging cable is connected to the inlet 250, so the number of times the relay in the charging route is operated does not need to be increased unnecessarily, and it is possible to extend the life of the relay.

Subsequently, in step S44, it is determined whether the switch 177 is operated within the predetermined period of time during which timer determination operation is waited in step S43. When the switch 177 is not operated in step S44, the process proceeds to step S46, and the timer setting is disabled such that charging is instantly started.

On the other hand, when the switch 177 is operated within the predetermined period of time in step S44, the process proceeds to step S45, and the ECU 170 enables timer setting and enters a standby state without charging until the set charging start time comes.

After the process of step S45 or step S46, the switch 177 operates as a lock/unlock change-over switch for the cable. That is, in step S47, detection of operation of the switch 177 is waited and, when the operation has been detected, the process proceeds to step S48, and the ECU 170 causes the cable lock mechanism 260 to lock the cable, after which the process proceeds to step S49.

In step S49, detection of operation of the switch 177 is waited again, and, when the operation has been detected, the process proceeds to step S50, and the ECU 170 causes the cable lock mechanism 260 to unlock the cable, after which the process returns to step S47.

Figure 15:
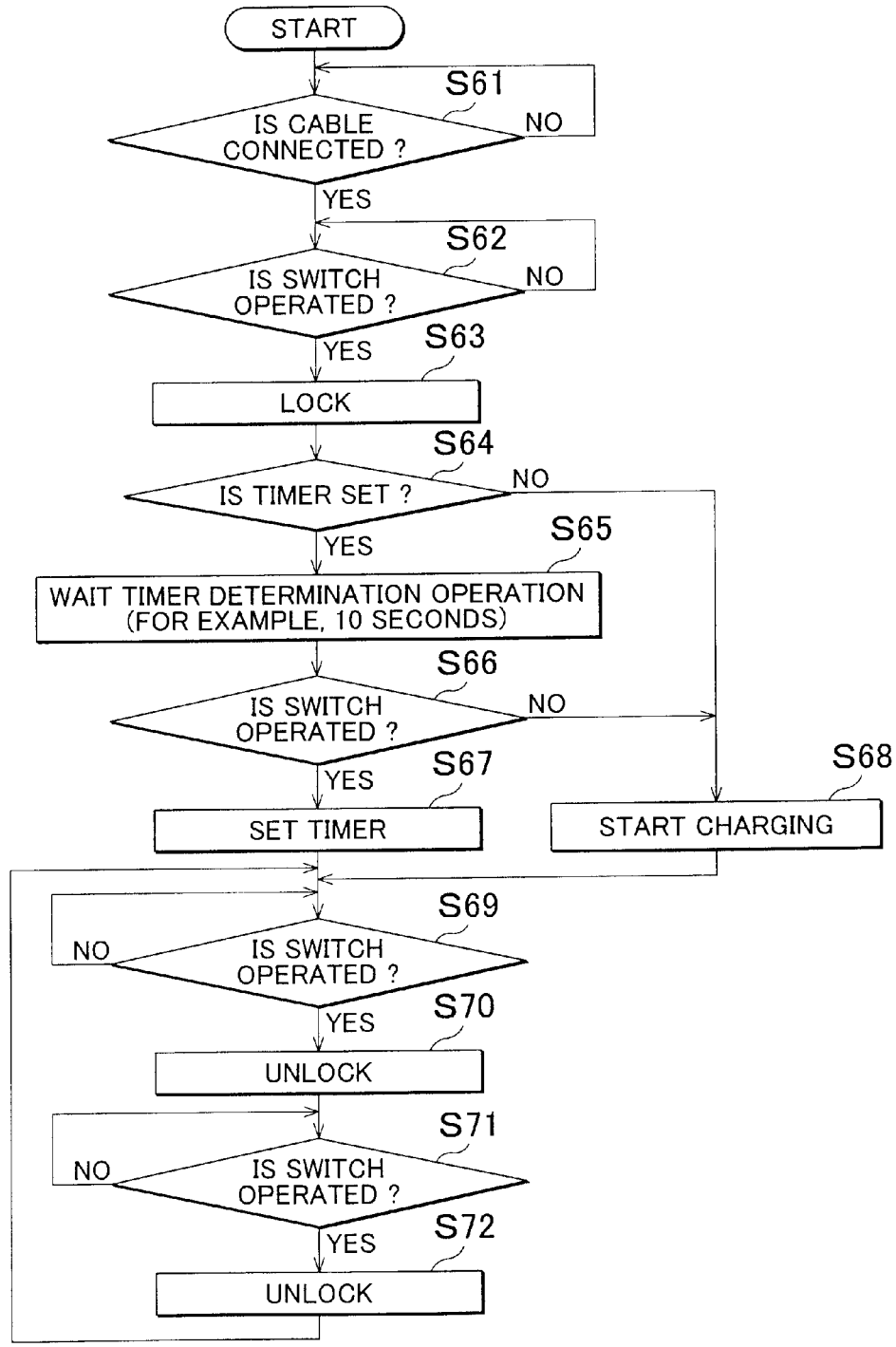
FIG. 15 is a flowchart for illustrating a third example of a process in the case where autolock is not set in the control according to the second embodiment and how the ECU uses the switch in different ways.

Hereinafter, as shown in FIG. 15, the embodiment may be modified into a mode in which, after the user connects the charging cable to the inlet 250, the cable is locked through the first operation and, after that, timer setting is determined.

FIG. 15 is a flowchart for illustrating a third example of a process in the case where autolock is not set and how the ECU uses the switch in different ways. As shown in FIG. 4, FIG. 6 and FIG. 15, initially, when the process is started, the ECU 170 determines in step S61 whether the charging cable is connected to the inlet 250. The ECU 170 is able to acquire whether the cable is connected on the basis of the signal PISW or the signal CPLT.

When cable connection has not been detected in step S61, the process remains in step S61, and enters a detection waiting state. In step S61, when cable connection has been detected, the ECU 170 proceeds with the process to step S62.

That is, in step S62, detection of operation of the switch 177 is waited and, when the operation has been detected, the process proceeds to step S63, and the ECU 170 causes the cable lock mechanism 260 to lock the cable, after which the process proceeds to step S64.

In step S64, the ECU 170 determines whether the charging start time of the timer is set by the timer charging setting unit 176 shown in FIG. 4 in advance. When the timer has not been set in step S64, the process proceeds to step S68, and the timer setting is disabled such that charging is instantly started.

On the other hand, when the charging start time of the timer has been set in step S64, the process proceeds to step S65. In step S65, timer determination operation is waited for a predetermined period of time. The predetermined period of time is, for example, 10 seconds, and may be adjusted as needed. With this waiting time, charging is not started immediately for a while after the charging cable is connected to the inlet 250, so the number of times the relay in the charging route is operated does not need to be increased unnecessarily, and it is possible to extend the life of the relay.

Subsequently, in step S66, it is determined whether the switch 177 is operated within the predetermined period of time during which timer determination operation is waited in step S65. When the switch 177 is not operated in step S66, the process proceeds to step S68, and the timer setting is disabled such that charging is instantly started.

On the other hand, when the switch 177 is operated within the predetermined period of time in step S66, the process proceeds to step S67, and the ECU 170 enables timer setting and enters a standby state without charging until the set charging start time comes.

After the process of step S67 or step S68, the switch 177 operates as a lock/unlock change-over switch for the cable. That is, in step S69, detection of operation of the switch 177 is waited again, and, when the operation has been detected, the process proceeds to step S70, and the ECU 170 causes the cable lock mechanism 260 to unlock the cable, after which the process proceeds to step S71.

In step S71, detection of operation of the switch 177 is waited again, and, when the operation has been detected, the process proceeds to step S72, and the ECU 170 causes the cable lock mechanism 260 to lock the cable, after which the process returns to step S69.

In order to apply the process of FIG. 15 to the first embodiment, step S67 may be modified into a timer disabling process (instant charging) and step S68 may be modified into a timer enabling process.

Lastly, the first and second embodiments will be summarized with reference to the drawings again. The charging device for the vehicle, described in the first or second embodiment, is configured to be able to carry out timer charging in which the charging device is set in a standby state without charging until charging start time comes when the charging start time is set. The charging device for the vehicle includes the charger 240 that charges the electrical storage device 150 of the vehicle with electric power supplied from a device outside the vehicle, the cable lock mechanism 260 that locks the charging cable in a state where the charging cable is connected to the inlet 250, and the ECU 170 that determines whether to carry out the timer charging or carry out instant charging without carrying out the timer charging on the basis of the state of the switch 177, associated with operation of the cable lock mechanism 260, and that controls the charger 240.

Here, as shown in step S3 to step S6 in FIG. 8, the ECU 170 may control the charger 240 such that instant charging is carried out when the switch 177 is operated within the predetermined period of time from when the charging cable is connected to the inlet 250.

In addition, as shown in step S23 to step S26 in FIG. 12, the ECU 170 may control the charger 240 such that instant charging is carried out when the switch 177 is not operated within the predetermined period of time from when the charging cable is connected to the inlet 250.

In addition, as shown in FIG. 11, the ECU 170 may use the switch 177 as the timer cancellation switch when the charging cable is not connected to the inlet 250; whereas the ECU 170 may use the switch 177 as a switch for changing the locked state of the cable lock mechanism 260 when the charging cable is connected to the inlet.

In addition, as shown in FIG. 13, the ECU 170 may use the switch 177 as the timer determination switch when the charging cable is not connected to the inlet 250; whereas the ECU 170 may use the switch 177 as a switch for changing the locked state of the cable lock mechanism 260 when the charging cable is connected to the inlet 250.

Furthermore, in addition, as shown in FIG. 15, the ECU 170 may use the switch 177 as a switch for causing the cable lock mechanism 260 to lock the charging cable immediately after the charging cable is connected to the inlet 250; whereas the ECU 170 may enable or disable timer charging in the case where the switch is operated (YES in step S66) within the predetermined period of time from when the cable lock mechanism 260 is set to the locked state (step S63) for the first time after the charging cable is connected to the inlet 250.

The invention claimed is:

1. A charging device for a vehicle, the vehicle configured to carry out timer charging in which the charging device is set in a standby state without charging until a charging start time arrives when the charging start time is set, the charging device comprising:

a charger configured to charge an electrical storage device of the vehicle with electric power supplied from a device outside the vehicle;

a lock mechanism configured to inhibit movement of an engaging portion of a connector of a charging cable when the engaging portion engages an inlet provided in the vehicle so as to lock the charging cable and the connector in a connected state to the inlet, the connector being provided at an end portion of the charging cable; and an electronic control unit configured to determine whether to carry out the timer charging or to carry out instant charging without carrying out the timer charging based on a state of a switch provided on the vehicle to operate the lock mechanism, the electronic control unit also being configured to control the charger.

2. The charging device according to claim 1, wherein the electronic control unit is configured to control the charger such that the charger carries out the instant charging when the switch is operated within a predetermined period of time from when the charging cable is connected to the inlet.

3. The charging device according to claim 1, wherein the electronic control unit is configured to control the charger such that the charger carries out the timer charging when the switch is not operated within a predetermined period of time from when the charging cable is connected to the inlet.

4. The charging device according to claim 1, wherein the electronic control unit is configured to control the charger such that the charger carries out the instant charging when the switch is not operated within a predetermined period of time from when the charging cable is connected to the inlet.

5. The charging device according to claim 1, wherein the electronic control unit is configured to control the charger such that the charger carries out the timer charging when the switch is operated within a predetermined period of time from when the charging cable is connected to the inlet.

6. The charging device according to claim 1, wherein the electronic control unit is configured to use the switch as a timer cancellation switch when the charging cable is not connected to the inlet, the electronic control unit also being configured to use the switch as a switch for changing a locked state of the lock mechanism when the charging cable is connected to the inlet.

7. The charging device according to claim 1, wherein the electronic control unit is configured to use the switch as a timer determination switch when the charging cable is not connected to the inlet, the electronic control unit being configured to use the switch as a switch, for changing a locked state of the lock mechanism when the charging cable is connected to the inlet.

8. The charging device according to claim 1, wherein the electronic control unit is configured to use the switch as a switch for causing the lock mechanism to lock the charging cable to the inlet immediately after the charging cable is connected to the inlet, the electronic control unit also being configured to control the charger such that the charger carries out the timer charging when the switch is operated within a predetermined period of time from when the lock mechanism is set to a locked state for the first time after the charging cable is connected to the inlet.

9. The charging device according to claim 1, wherein the electronic control unit is configured to use the switch as a switch for causing the lock mechanism to lock the charging cable to the inlet immediately after the charging cable is connected to the inlet, the electronic control unit also being configured to control the charger such that the charger carries out the instant charging when the switch is not operated within a predetermined period of time from when the lock mechanism is set to a locked state for the first time after the charging cable is connected to the inlet.

10. The charging device according to claim 1, wherein the electronic control unit is configured to use the switch as a switch for causing the lock mechanism to lock the charging cable to the inlet immediately after the charging cable is connected to the inlet, the electronic control unit also being configured to control the charger such that the charger carries out the instant charging when the switch is operated within a predetermined period of time from when the lock mechanism is set to a locked state for the first time after the charging cable is connected to the inlet.

11. The charging device according to claim 1, wherein the electronic control unit is configured to use the switch as a switch for causing the lock mechanism to lock the charging cable to the inlet immediately after the charging cable is connected to the inlet, the electronic control unit also being configured to control the charger such that the charger carries out the timer charging when the switch is not operated within a predetermined period of time from when the lock mechanism is set to a locked state for the first time after the charging cable is connected to the inlet.

* * * * *